June 30, 1953     W. LINDEMANN ET AL     2,643,558
INSTALLATION FOR USE WITH SCRAP BRIQUETTING PRESSES
Filed April 23, 1949
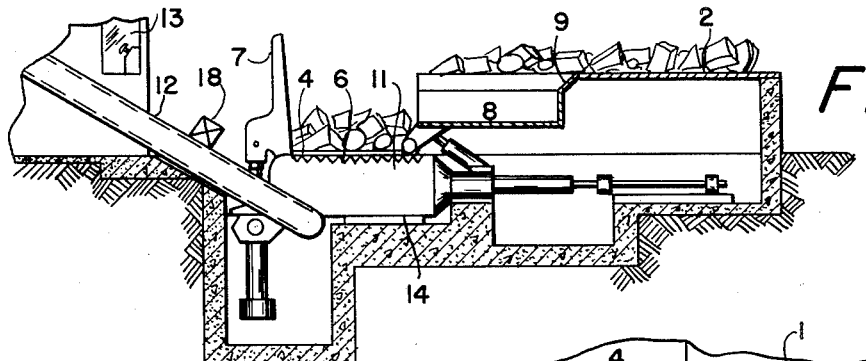
Fig-1-
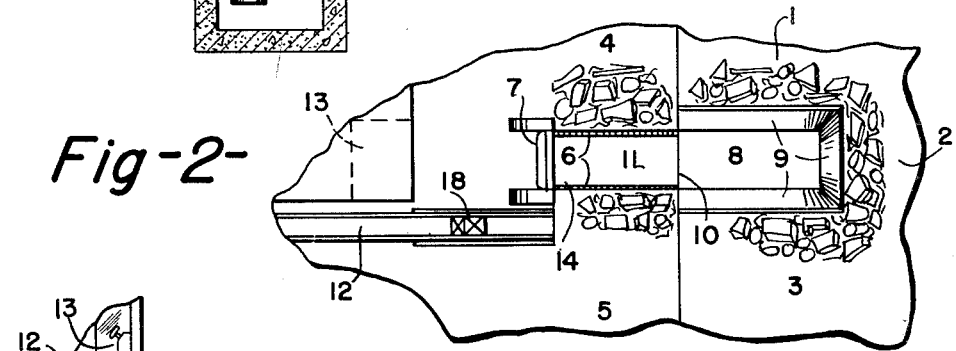
Fig-2-
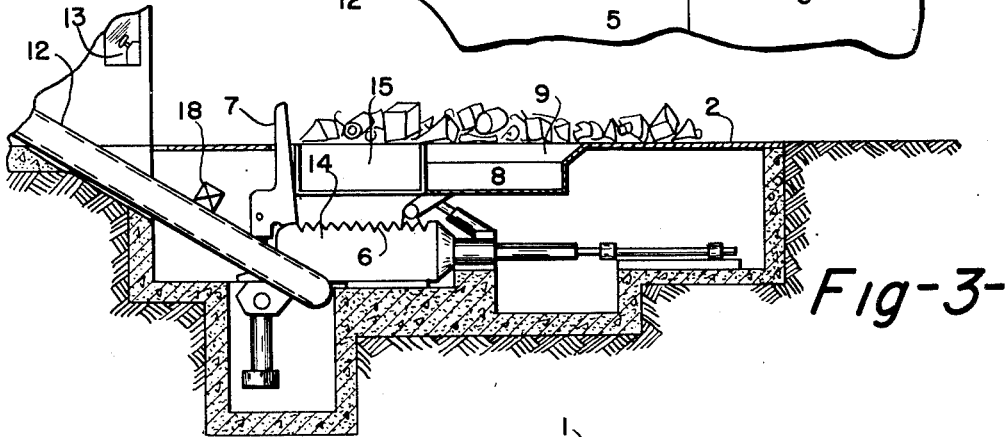
Fig-3-
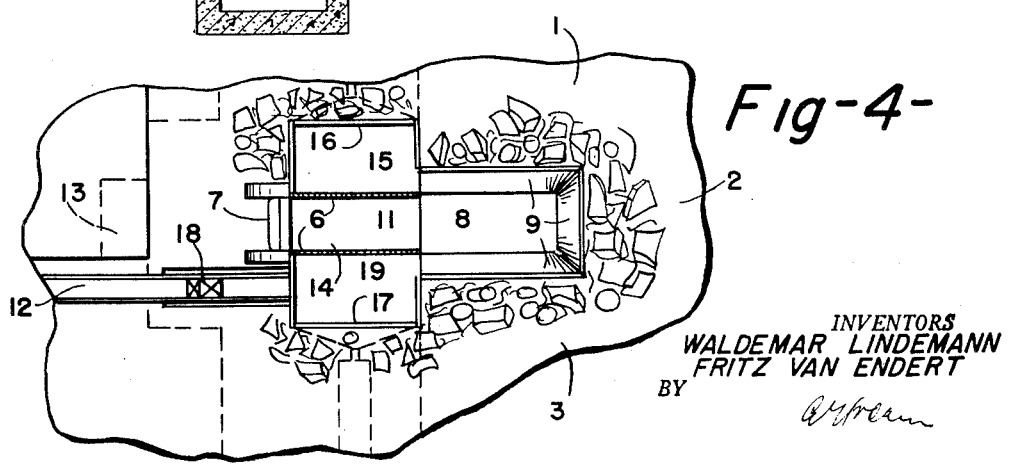
Fig-4-
INVENTORS
WALDEMAR LINDEMANN
FRITZ VAN ENDERT
BY
ATTORNEY Patented June 30, 1953

2,643,558

UNITED STATES PATENT OFFICE 2,643,558

INSTALLATION FOR USE WITH SCRAP BRIQUETTING PRESSES

Waldemar Lindemann and Fritz van Endert, Duesseldorf, Germany

Application April 23, 1949, Serial No. 89,245
In Germany March 30, 1949

1 Claim. (Cl. 78—0.5)

The invention relates to a scrap briquetting press.

Scrap briquetting presses of varying types are known. Some of these presses are provided with covers or lids pivotally connected with the press box; the lid is lowered with a tight fit into the pressing space in order to sever projecting or overhanging scrap parts.

It is the main object of the present invention to simplify, to intensify and to accelerate these individual work phases of a hydraulically operated scrap briquetting press.

In compliance with this object the working space of the press box is operatively coupled with an elevated scrap storing podium and this podium is provided with one or more charging troughs which operatively communicate with the box and transport its scrap contents into the same. This transport of the scrap may be effected by tilting the troughs or by slides which push the scrap from the troughs into the press box.

The scrap feeding troughs are numerically not restricted. An essential reduction of the working time may be already effected by the installation of one trough preferably located at the front side of the press box. However, it is advisable to install three charging troughs in the elevated scrap storing podium in such a manner that two troughs are located on the two long sides of the press, whereas the third trough is attached to its front; it is recommended to construct the lateral troughs as so-called slide or push troughs, of which the bottoms lie in the same plane as the upper edge of the press box; with these troughs the unloading of the scrap into the pressing space is accomplished by pushers or slides. The location of these two slide troughs on opposite sides of the press has the further advantage that the scrap may be charged in the press box from both throughs contemporaneously. A very efficient precompression of the scrap is thus achieved prior to its entrance into the press. The third trough may be preferably constructed as a tilting trough; however, also this trough may be a push or slide trough.

The cooperation of these troughs located in the elevated scrap storing podium with the press which should be preferably provided with scrap cutters enables a surprising reduction of the pressing time.

The scrap may be stored on the elevated podium along the circumference of the press and charged from here into the press box manually or by means of magnets or mechanical grippers. The provision of several loading troughs renders it possible to work on a fully continuous basis by loading the scrap into and unloading the same successively from the individual troughs in such a manner that the scrap contents of one trough is always present in the press box. If the removal of the finished briquettes, which may be affected by transporting bands, is organically coupled with the operation of the troughs and the press, a highly economical fully automatic operation results which may be controlled from a centrally located steering place.

The invention is by way of example illustrated in the attached drawings.

In the drawings,

Fig. 1 is a side view of a scrap briquetting press installation provided with one charging trough in conformity with this invention, Fig. 2 is a top plan view thereof, Figs. 3 and 4 are a side and top plan view of a similar installation provided with three troughs.

In conformity with the embodiment of this invention illustrated in Figs. 1 and 2 the feed opening 11 of the press box 14 is located at the same level as the ground floor 4, 5; cutters 6 are provided at the edges of the press box 14. A lid 7 is pivotally attached to the one short side of the press box.

A scrap charging trough 8 is located at the front of the press box in the elevated scrap storing podium 1, 2, 3; the trough is pivotally connected with the press box and its inclined upper edge portions 9 lie flush with the storing podium. Whereas only the front portion of the press box communicates with the scrap storing podium 1, 2, 3 through the intermediary of the trough 8 the lateral edges of the press box which are provided with cutters 6 lie flush with the ground floor 4, 5. A sufficient supply of scrap may be stored on the podium 1, 2, 3.

This combination of the press box 14 with an elevated trough 8 provided scrap storing podium 1, 2, 3 enables a full automatic press operation insofar as the press box 14 after each work sequence may be charged from the trough 8 or from the ground floor 4, 5 within a very short period, whereas in the meantime additional scrap quantities may be accumulated in the neighborhood of the trough. The finished scrap briquettes are delivered onto the transporting band 12; the succession of the various work phases is controlled from a central observation place 13.

A further improved operation is achieved if, as shown in Figs. 3, 4, two lateral loading troughs 15, 19 are located in the scrap storing podium 1, 2, 3; it is advisable to construct these troughs as slide troughs in such a manner that the scrap accumulated therein is pushed from two sides into the press box 5 by means of schematically indicated pushers 16, 17, Fig. 4. If the two pushers or slides are simultaneously advanced an essential compacting of the scrap is achieved prior to and during its filling into the press box 14.

A full automatic operation is achieved in this installation insofar as the tilting trough 8 and the lateral push troughs 15, 19 cooperate in such a manner that the charging of the press box immediately takes place upon the opening of lid 7. The compacted scrap briquettes 18 are transferred on the transporting band 12 to a discharge place and the installation is controlled from a centrally located observation place 13.

The invention has been described with reference to a preferred embodiment and it will be understood that many variations and modifications thereof may be resorted to without departure from the scope of the invention as defined in the following claim.

What we claim is:

In combination with a scrap storing podium, a scrap briquetting press, a press box in said press said press box having an upper charge opening, said opening being located at a lower level than the level through which said podium extends, a recess in said podium next to said charging opening, a scrap charging trough located in said recess tiltably connected with said press box and located in its horizontal filling position in a level which extends between the podium level and the level through which the charging opening extends, two recesses adjacently located at the opposite lateral sides of said press box, two loading troughs in said recesses, the upper edges of said two troughs located at approximately the same level as said podium, the bottom of said troughs located at an intermediary level between said charging opening and said podium and pushers provided in said two troughs on the two lateral sides of said press box to push the scrap in a mutually opposite direction from said lateral troughs into said press box.

WALDEMAR LINDEMANN.
FRITZ van ENDERT.

References Cited in the file of this patent

UNITED STATES PATENTS

| Number | Name | Date |
|---|---|---|
| 1,120,655 | Kinter | Dec. 8, 1914 |
| 1,812,797 | Lindemann | June 30, 1931 |
| 1,966,378 | Dinzl | July 10, 1934 |